H. THORENS.
FRAME FOR THE DRIVING MECHANISM OF TALKING MACHINES.
APPLICATION FILED FEB. 4, 1915.
1,184,275.
Patented May 23, 1916.
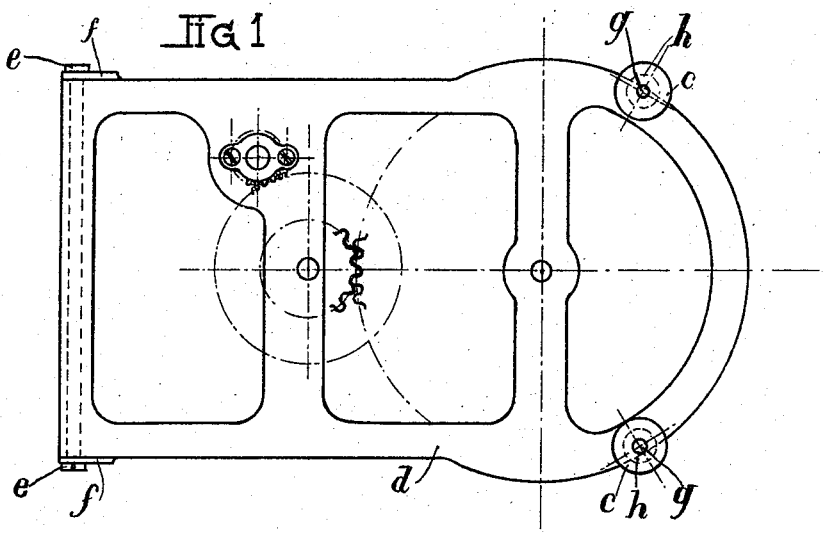
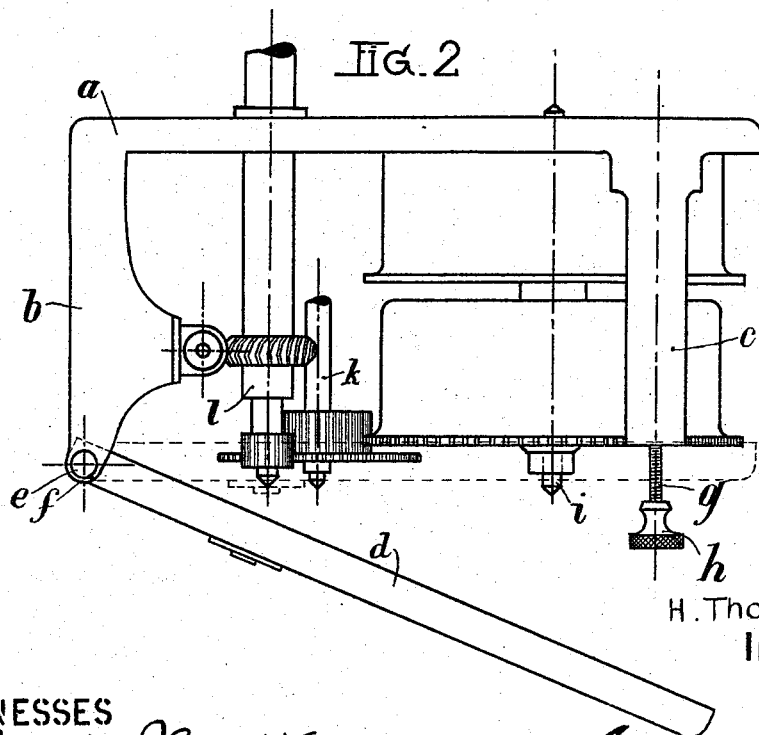
H. Thorens.
INVENTOR
WITNESSES
Charles H Crompton
May G Luttrell
BY G Craydon Marks
ATTORNEY

UNITED STATES PATENT OFFICE.

HERMANN THORENS, OF STE.-CROIX, SWITZERLAND.

FRAME FOR THE DRIVING MECHANISM OF TALKING-MACHINES.

1,184,275.   Specification of Letters Patent.   Patented May 23, 1916.

Application filed February 4, 1915.   Serial No. 6,020.

*To all whom it may concern:*

Be it known that I, HERMANN THORENS, a citizen of the Swiss Republic, residing at Ste.-Croix, in the Canton of Vaud, in Switzerland, have invented certain new and useful Improvements in Frames for the Driving Mechanism of Talking-Machines, of which the following is a specification.

This invention has for its object to provide an improved frame for the driving mechanism of a talking machine.

The improved frame consists of at least two sheet metal stampings connected together by a hinge and a fastening, the whole being so arranged as to enable the mechanism to be dismantled or dismounted by hand without the aid of any tool.

One embodiment of this invention is illustrated by way of example in the accompanying drawings in which:—

Figure 1 is an underside view of the frame showing the location of the parts of the driving mechanism, and Fig. 2 is a side elevation thereof.

As shown, the improved frame comprises two main parts, namely, a part $a$ of stamped sheet metal having extensions $b$ and $c$ that serve as supports for the other main part $d$. This part $d$ is hinged at one end to the part $a$ by means of a pin $e$ fixed in two lugs $f$ of the extension $b$. The other end of the part $d$ is adapted to rest upon the ends of the two extensions $c$, with which screws $g$ provided with milled nuts $h$ engage for the purpose of holding the part $d$ rigidly in place. As shown, the part $d$ serves as the back plate for the driving mechanism, and the arbors of the barrels $i$, pinions $k$ and $l$, are journaled in the said plate. It is therefore merely necessary to unscrew the milled nuts $h$ and to lift off the plate $d$ which can then be swung on its hinge pin $e$ so as to allow the driving mechanism to be dismounted without the aid of any tool.

What I claim is:

1. In a frame for the driving mechanism of a talking machine, the combination of a plurality of sheet metal parts including bearings for the various shafts of the driving mechanism, a hinge-like device connecting said parts together, and a fastening for holding said parts in place in their closed or swung-to position, whereby it is merely necessary to undo said fastening, and swing open one of said parts on its hinge, in order to be able to dismantle the driving mechanism of the talking machine completely by hand without the use of any tool.

2. In a frame for the driving mechanism of a talking machine, the combination of two sheet metal stampings including bearings for the various shafts of the driving mechanism, a hinge-like device connecting said two stampings together, and a fastening for holding said stampings in place in their closed or swung-to position; whereby it is merely necessary to undo said fastening and swing open one of said stampings on its hinge, in order to be able to dismantle the driving mechanism of the talking machine completely by hand without the use of any tool.

In testimony whereof I have signed my name to this specification in the presence of two subscribing witnesses.

HERMANN THORENS.

Witnesses:
  CARLOS E. LEMBEKE,
  LOUIS H. MUNIER.

Copies of this patent may be obtained for five cents each, by addressing the "Commissioner of Patents, Washington, D. C."